(12) United States Patent
Bishay et al.

(10) Patent No.: US 11,540,139 B2
(45) Date of Patent: Dec. 27, 2022

(54) ADAPTIVE NETWORK SLICING VIA OVERLAYING DECOMPOSITION AND INHERITANCE

(71) Applicant: Ciena Corporation, Hanover, MD (US)

(72) Inventors: Fadi Bishay, Quebec (CA); Logaina Michel Ramzy Boulos, Quebec (CA); Bernard Toko, Quebec (CA)

(73) Assignee: Ciena Corporation, Hanover, MD (US)

( * ) Notice: Subject to any disclaimer, the term of this patent is extended or adjusted under 35 U.S.C. 154(b) by 114 days.

(21) Appl. No.: 16/595,810

(22) Filed: Oct. 8, 2019

(65) Prior Publication Data

US 2021/0105628 A1 Apr. 8, 2021

(51) Int. Cl.
*H04W 16/02* (2009.01)
*H04W 84/04* (2009.01)

(52) U.S. Cl.
CPC .......... *H04W 16/02* (2013.01); *H04W 84/042* (2013.01)

(58) Field of Classification Search
CPC .. H04W 16/02; H04W 84/042; H04L 41/145; H04L 41/5054; H04L 41/5048
See application file for complete search history.

(56) References Cited

U.S. PATENT DOCUMENTS

| 10,187,318 B2 | 1/2019 | Cote et al. |
| 2019/0230046 A1 | 7/2019 | Djukic et al. |
| 2019/0378519 A1* | 12/2019 | Dunjic ................. G06F 21/32 |
| 2020/0099691 A1* | 3/2020 | Akselrod ............... H04L 67/02 |
| 2021/0219256 A1* | 7/2021 | Sartori ................. H04W 12/06 |

FOREIGN PATENT DOCUMENTS

WO 2018228698 A1 12/2018

OTHER PUBLICATIONS

NGMN Alliance, "5G End-to-End Architecture Framework", Version v0.8.1, Oct. 4, 2017, pp. 1-36.
Geng et al., "Network Slicing Architecture", Network Working Group, Internet Draft, Jul. 3, 2017, pp. 1-27.
Galis et al., "Network Slicing—Revised Problem Statement", No Working Group, Internet Draft, Jul. 3, 2017, pp. 1-29.
5GPPP Architecture Working Group, "View on 5G Architecture", Version 2.0, Dec. 15, 2017, pp. 1-140.
Dec. 16, 2020, International Search Report and Written Opinion for International Application No. PCT/US2020/053888.

* cited by examiner

*Primary Examiner* — Chi H Pham
*Assistant Examiner* — Raul Rivas
(74) *Attorney, Agent, or Firm* — Clements Bernard Baratta; Lawrence A. Baratta, Jr.; Christopher L. Bernard

(57) ABSTRACT

Systems and methods include provisioning a default slice having a default subdomain corresponding to a set of resources that are any of physical and virtual components in a network; decomposing the default subdomain into a first set of one or more subdomains, wherein collectively the first set of one or more subdomains include all of the set of resources; provisioning one or more application slices as children from the default slice that inherit capabilities of the default slice; and assigning one or more subdomains from the first set of the one or more subdomains to the respective one or more application slices.

18 Claims, 9 Drawing Sheets

ADAPTIVE NETWORK SLICING VIA OVERLAYING DECOMPOSITION AND INHERITANCE

FIELD OF THE DISCLOSURE

The present disclosure generally relates to networking. More particularly, the present disclosure relates to systems and methods for adaptive network slicing via overlaying decomposition and inheritance.

BACKGROUND OF THE DISCLOSURE 5G is more than a set of standards for next-generation wireless networking. Rather, 5G includes aspects of wireless and wireline network integration. One key aspect of 5G is network slicing which allows operators to split a single physical network into multiple virtual networks. Thus, operators deploy one single physical infrastructure and partition networks virtually using network slicing. Network slicing technology enables operators to provide networks on an as-a-service basis, which enhances operational efficiency while reducing time-to-market for new services. A network slice could span across multiple parts of the network (e.g., terminal, access network, core network, and transport network) and could also be deployed across multiple operators. A network slice includes dedicated and/or shared resources, e.g., in terms of processing power, storage, and bandwidth and has isolation from the other network slices. Slice types could be defined from a functional, operational, or behavioral perspective.

There does not exist a comprehensive approach yet defined for network slicing. Rather, network slicing has been addressed in part through multiple standards, such as 5G NGMN (Next Generation Mobile Networks) and 3GPP (3rd Generation Partnership Project). These standards define how network resources need to be segmented into sub-networks then assembled as separate slices. Although they address the aspect of the granularity required to fulfill a specific service over predetermined network capability and state, they come short in meeting the need for a dynamic and flexible approach.

Standards and industry recommendations have not provided an answer to how resources can be sliced with extremely fine granularity while assuring an adjustable level of separation and share-ability based on application requirements and network capability. There is a requirement for an agile and flexible composition of network slices to operate a true adaptive network that meets the changing demands of an application and to address a time-bound Lifecycle Service Orchestration (LSO) to fulfill a bandwidth or service on-demand requirement.

The existing approach to network slicing includes a flat nature that imposes rigidity. For example, when changes are needed, a redesign of the slices becomes inevitable and forcing a service provider into one or more of these intrusive operations, such as Moving resources from one sub-network instance to the another. All slices having any of the involved sub-network instances will be indirectly impacted, requiring intensive redesign activity;

Moving a sub-network instance from one slice to another which has a direct impact on one or more applications, which also needs to be thoroughly assessed; and Changing the shareability of a sub-network instance: Accordingly, all its resources would be shared across different slices, which is more than the targeted set of resources.

BRIEF SUMMARY OF THE DISCLOSURE

In an embodiment, a non-transitory computer-readable medium includes instructions that, when executed, cause one or more processors to perform the steps of provisioning a default slice having a default subdomain corresponding to a set of resources that are any of physical and virtual components in a network; decomposing the default subdomain into a first set of one or more subdomains, wherein collectively the first set of one or more subdomains include all of the set of resources; provisioning one or more application slices as children from the default slice that inherit capabilities of the default slice; and assigning one or more subdomains from the first set of the one or more subdomains to the respective one or more application slices. The instructions can further cause one or more processors to perform the step of performing management of the underlying physical and virtual components utilizing the first set of the one or more subdomains. The instructions that, when executed, can further cause one or more processors to perform the step of decomposing the first set of the one or more subdomains into a second set of the one or more subdomains, wherein collectively the first set and the second set of the one or more subdomains include all of the set of resources. The instructions that, when executed, can further cause one or more processors to perform the step of compressing the second set of the one or more subdomains back into the first set of the one or more subdomains, as a result of a deletion. The instructions that, when executed, can further cause one or more processors to perform the step of maintaining a Group Access Object for each of the default slice and the one or more application slices to define authority of tenants for each of the default slice and the one or more application slices. The instructions that, when executed, can further cause one or more processors to perform the step of deleting an application slice of the one or more application slices by an owner and addressing any subdomains contained therein. The one or more application slices can each be required to have a parent slice which defines associated limits. The one or more application slices can each be required to have a parent slice from which constraints and restrictions are inherited initially and adjusted accordingly. Resources in the first set of one or more subdomains can be non-overlapping.

In another embodiment, an apparatus includes one or more processors and memory comprising instructions that, when executed, cause the one or more processors to provision a default slice having a default subdomain corresponding to a set of resources that are any of physical and virtual components in a network, decompose the default subdomain into a first set of one or more subdomains, wherein collectively the first set of one or more subdomains include all of the set of resources, provision one or more application slices as children from the default slice that inherit capabilities of the default slice, and assign one or more subdomains from the first set of the one or more subdomains to the respective one or more application slices.

In a further embodiment, a method includes provisioning a default slice having a default subdomain corresponding to a set of resources that are any of physical and virtual components in a network; decomposing the default subdomain into a first set of one or more subdomains, wherein collectively the first set of one or more subdomains include all of the set of resources; provisioning one or more application slices as children from the default slice that inherit capabilities of the default slice; and assigning one or more subdomains from the first set of the one or more subdomains to the respective one or more application slices.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
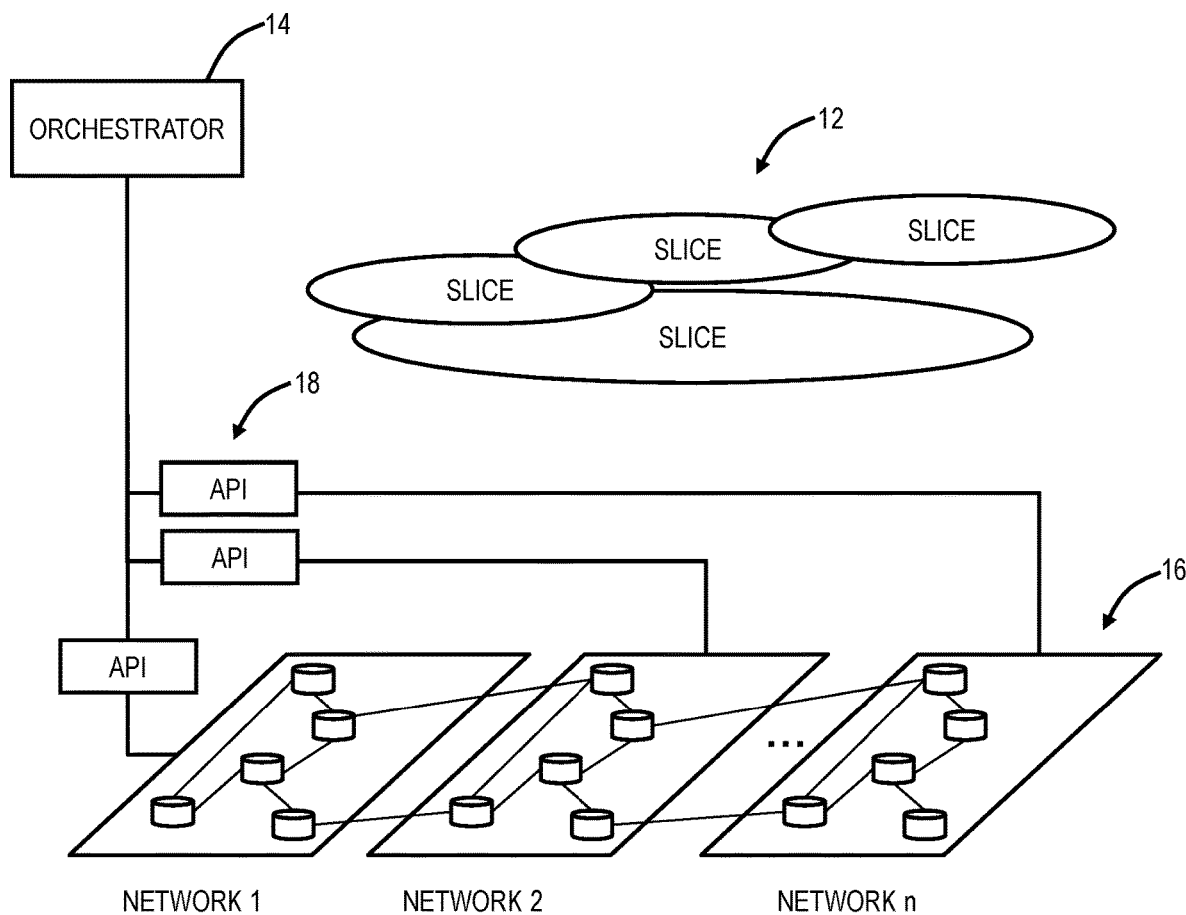
FIG. 1 is a network diagram of a network illustrating network slices and an orchestrator.

The present disclosure relates to systems and methods for adaptive network slicing via overlaying decomposition and inheritance. The challenge addressed by the present disclosure is not the granularity in which different network domains can be sliced or even how such slices can be composed to achieve a determined purpose, but rather with the flexibility and dynamic nature of such systems to allow continuously adaptation to new application needs and network realities. The present disclosure describes implementing adaptive network slices or dynamic compositions that are created on-demand with minimal network components optimally placed to match the needs of the services that are provided. Specifically, the present disclosure provides 1) an adjustable level of separation and shareability based on application requirements and network capability, and 2) achievement of an agile and flexible composition of slices for a true adaptive network that meets the changing demands of an application.

Such goals are achieved by an information model and rules and business logic for the process that dictates the flow of those entities to achieve the required behavior. The information model is created with the ability for expansion to allow continuous adjustment while maintaining a baseline enforced by the standards. The information model includes defining several shareability modes of sub-network slices to allow finer granularity control over the sub-network slices and their resources. The information model adds Group Access Object (GAO) information on the network slice entities to define their position within the hierarchy of Tenants and accordingly define their boundaries of operation. The information model further introduces the concept of network slice extension allowing the slice holder tenant to adapt and augment the network slice with domain-specific resources which can take part in the end-to-end service orchestration.

The rules and business logic dictate the flow of those entities to achieve the required behavior and include sub-network slice containment rules and hierarchical network slice composition rules. The sub-network slice containment rules define how sub-network slices can be created and managed. They allow them to be created only by referencing another sub-network slice as the parent and thus scoping their creation to the parent's limits. For the hierarchical network slice composition rules, network slices can only inherit from another slice while allowing the owner to define the constraints and restrictions of the new slice; and the parent slice define the boundary of the sub-slice in regard to constraints, and resources. This provides flexible and easy management of network slices and sub-network slices. The business logic is abstracting the user from all the needed heavy-lifting during the entire lifecycle of network slices. This enables users with limited domain knowledge to perfectly operate and manage network slices.

With these goals met, now the network slicing can adapt to an evolving 5G network demand. It can also meet the broader requirement of a flexible multi-tenant Network-as-a-Service (NaaS) offer. Moreover, the proposed concept is agile enough to enable a combined offer where the service provider is executing a 5G Slicing use case within a NaaS offer, achieving the ultimate goal of Network-Slice-as-a-Service (NSaaS). Such separation of context is applicable for a broad definition of a tenant. Basically, a set of users required controlled visibility, lifecycle, and self-service, such as a division within the service provider, a subsidiary or a channel partner, a roaming partner, a wholesaler, and an enterprise customer.

Network Slices

Figure 9:
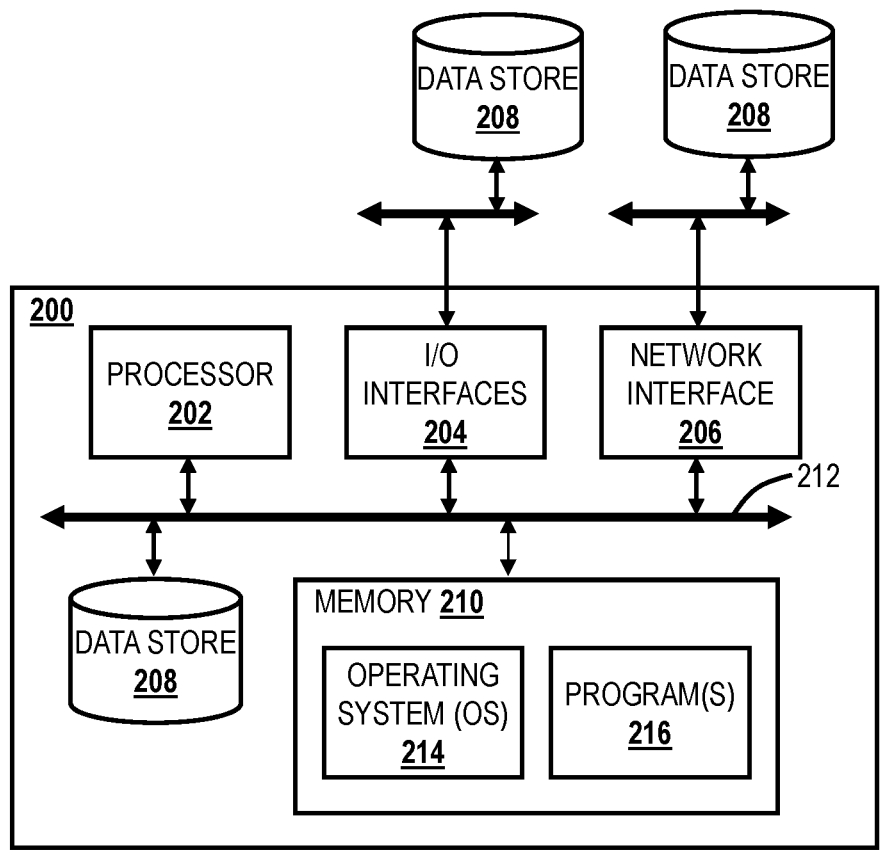
FIG. 9 is a block diagram of n processing apparatus which may be used to realize the orchestrator, and/or other systems.

FIG. 1 is a network diagram of a network 10 illustrating network slices 12 and an orchestrator 14. The network 10 includes one or more networks 16, which can include physical network elements, virtual network elements, and combinations thereof supporting network, compute, and/or storage resources. For illustration purposes, FIG. 1 includes different networks 1, 2, . . . , n. The network slices 12 are services provisioned on the network, compute, and/or storage resources, via the corresponding network elements, across the networks 16. Again, the network slices 12 can span across multiple parts of the network 10 (e.g., terminal, access network, core network, and transport network) and could also be deployed across multiple operators/service providers, i.e., the networks 16. The network slices 12 can include dedicated and/or shared resources, e.g., in terms of processing power, storage, and bandwidth and has isolation from the other network slices. Slice types could be defined from a functional, operational, or behavioral perspective. The orchestrator 14 can be a processing apparatus, such as illustrated in FIG. 9. The orchestrator 14 can communicate with the networks 16 and the corresponding network elements via Application Programming Interfaces (APIs) 18.

Network slicing is the main building block of NaaS and an imperative construct of 5G technology. It allows multiple, logical networks to be created on top of a commonly shared physical infrastructure that is capable of supporting a broader service portfolio. Each virtual network (network slice 12) is a combination of an independent set of logical network functions that support the requirement of a particular use case. Each will be optimized to provide the resources and network topology for the specific service and traffic that will use the slice. Functions such as policy, speed, capacity, connectivity, coverage, and security will be allocated to meet the particular demands of each use case, but functional components may also be shared across different network slices 12.

Each slice 12 will be completely isolated so that no slice 12 can interfere with the traffic in another slice 12. Each will be configured with its own network architecture, engineering mechanism, and network provisioning. It will typically contain management capabilities, which may be controlled by the network operator or the customer depending on the use case. It will be independently managed and orchestrated, via the orchestrator 14.

Therefore, the key challenge when designing a network slicing solution is to ensure the creation of secure, very firmly isolated virtual networks, each of which serve a different use case for a certain user, tenant or application.

Figure 2:
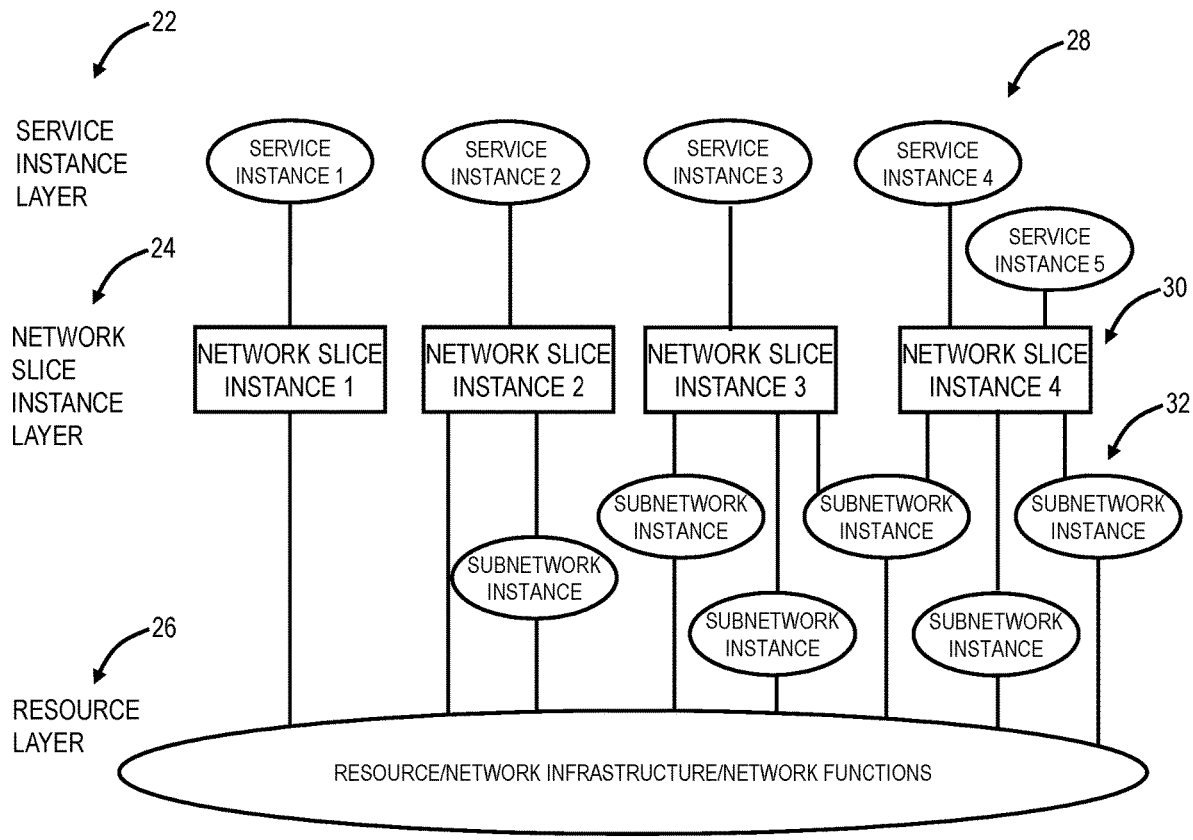
FIG. 2 is a diagram of an information model for network slices.

FIG. 2 is a diagram of an information model 20 for the network slices 12. The information model 20 can be a two-level model with a service instance layer 22 and a network slice instance layer 24, that controls a resource layer 26. As described herein, the information model (which may also be referred to as an object model, information model, etc.) includes computer data in a specified structure. The computer data is used to maintain and manage configurations of the resource layer 26, which corresponds to the network elements in the networks 16. That is, the computer data is used to program and configure the physical hardware or virtual functions associated with the networks 16. The resource layer 26 and the network elements can include any type of network, compute, and/or storage device, such as, without limitation, switches, routers, optical transport, wireless terminals, storage, servers, etc.

The computer data is further used by management systems (e.g., a controller on a network element, a control plane, SDN controller, Network Management System (NMS), Element Management System (EMS), the orchestrator 14, etc.) for performing various Operations, Administration, Maintenance, and Provisioning (OAM&P) functions. An aspect of the information model is to enable management interoperability between disparate vendors. By introducing the concept of technology-independent management, it is possible to perform management of diverse equipment using common communication interfaces. In this manner, a high-level view over a set of network elements can be achieved. An example of a data model is described in ITU-T Recommendation M.3100 "Generic network information model." (04/05), the contents of which are incorporated herein by reference.

The information model 20 includes service instances 28, network slice instances 30, and sub-network instances 32, of the resource layer 26.

Definitions

A network slice 12 is a logical network that provides specific network capabilities and network characteristics. The network slice 12 can be a managed group of subsets of resources, network functions/network virtual functions at the data, control, management/orchestration planes, and services at a given time. The network slice 12 is programmable and has the ability to expose its capabilities. The behavior of the network slice 12 is realized via network slice instance(s).

A resource in the resource layer 26 is a physical or virtual (network, compute, and/or storage) component available within a system. Resources can be very simple or fine-grained (e.g., a port or a queue) or complex, such as including multiple resources (e.g., a network device, network element, etc.).

A Network Function (NF) is a processing function in a network. It includes, but is not limited to, network nodes functionality, e.g., session management, mobility management, switching, routing functions, which has defined functional behavior and interfaces. Network functions can be implemented as a network node on dedicated hardware or as a virtualized software functions. Data, control, management, orchestration planes functions are Network Functions.

A Virtual Network Function (VNF) is a network function whose functional software is decoupled from hardware. One or more virtual machines running different software and processes on top of industry-standard high-volume servers, switches, and storage, or cloud computing infrastructure, and capable of implementing network functions traditionally implemented via custom hardware appliances and middle-boxes (e.g., router. NAT, firewall, load balancer, etc.).

A network element is defined as a manageable, logical entity uniting one or more network devices. This allows distributed devices to be managed in a unified way using one management system. It also means a facility or equipment used in the provision of a communication service. Such term also includes features, functions, and capabilities that are provided by means of such facility or equipment, including subscriber numbers, databases, signaling systems, and information sufficient for billing and collection or used in the transmission, routing, or other provision of a telecommunications service.

A service instance 28 is an instance of an end-user service or a business service that is realized within or by a network slice 12. Each service is represented by a service instance 28. Services and service instances would be provided by the network operator or by third parties.

A network slice instance 30 is a set of network functions and the required resources (e.g., compute, storage and networking resources) which form a deployed network slice 12. A network slice instance 30 is an activated network slice 12. It is created based on a network slice template, a set of managed run-time network functions, and resources to run these network functions, forming a complete instantiated logical network to meet certain network characteristics required by the service instance(s). It provides the network characteristics that are required by a service instance. A network slice instance may also be shared across multiple service instances provided by the network operator. The network slice instance may be composed by none, one or more sub-network instances, which may be shared by another network slice instance.

A network slice template is a complete description of the structure, configuration, and the plans/workflows for how to instantiate and control the network slice instance during its life cycle.

A sub-network instance 32 is a decomposition of a network slice instance 30, e.g., a network slice instance may be composed by none, one or more sub-network instances, which may be shared by another network slice instance.

In the information model 20 can provide a network decomposition through two levels—a first and a second level. For a first level slice, domain resources are segregated and grouped into different sub-network slice instances 32. For a second level slice, sub-network slice instances 32 are grouped into a cross-functional network slice instance 30. Both grouping levels are a non-hierarchical and single-dimension entity. The final results constitute all the resources needed across domains and layers to configure and activate a specific set of services. The first level slice can be a domain-specific slice and the second level slice can be a multidomain slice (e.g., vertical).

Overlaying Decomposition and Inheritance for Network Slicing

While the slices 12 might be initially adjusted to meet the requirements of the use case, they need to remain flexible and agile to continuously adjust and adapt to an ever-changing network characteristic and application/user demand.

The present disclosure enables flexible, dynamic, and adjustable network slice composition within the overall physical and virtual assets available for a tenant, being a user group that in a NaaS context needs to transparently operate on one or more slices 12 of the network 10. Such goal is achieved by a containment-based sub-network slicing overlaid on top of an inheriting hierarchy of network slices 12.

In a first aspect, the containment of sub-network slices will be used for recursive decomposition of network infrastructure and virtual assets. Hence, discovered and orchestrated resources can flow along the hierarchy line of their containment tree. They are allowing not only the shaping of potential capability for each sub-network but its continuous adjustment. Such a model will turn each sub-network slice into a flexible, yet an isolated container of assets.

In a second aspect, the present disclosure includes an inheritance nature of network slices 12. Each network slice 12 can have a mandatory single parent slice, only from which it can receive a subset of its subnetwork slices and inherits all of the constraints and restrictions. While tightly coupled to its parent from a composition perspective, it operates as an autonomous, self-contained entity from a lifecycle standpoint. Hence, being assignable to child tenants and fulfilling its intended purpose. Also, this inheritance concept is recursive, enabling a multi-level slice hierarchy.

Fundamentally, resources moving explicitly across the sub-network hierarchy will implicitly finetune the shape of the overall network slice, allowing it to adjust for changing application needs and tenant resource entitlement, while the expansion and retraction of subnetwork slices across the inheritance of the network slice hierarchy allows on-the-fly redefinition of the overall scope and purpose of each network slices.

The present disclosure provides a system capable of dynamically composing network slices 45, becoming adaptive to user or application needs. This adaptive slicing concept includes the two aspects—1) recursive sub-network decomposition and 2) hierarchical slice composition. Each of these aspects, though having their own binding rules, is not intended to provide atomic value. Rather, by superposing both and overlaying the governing lifecycle rules, the adaptive value is realized.

Recursive Subdomain Decomposition

Figure 3:
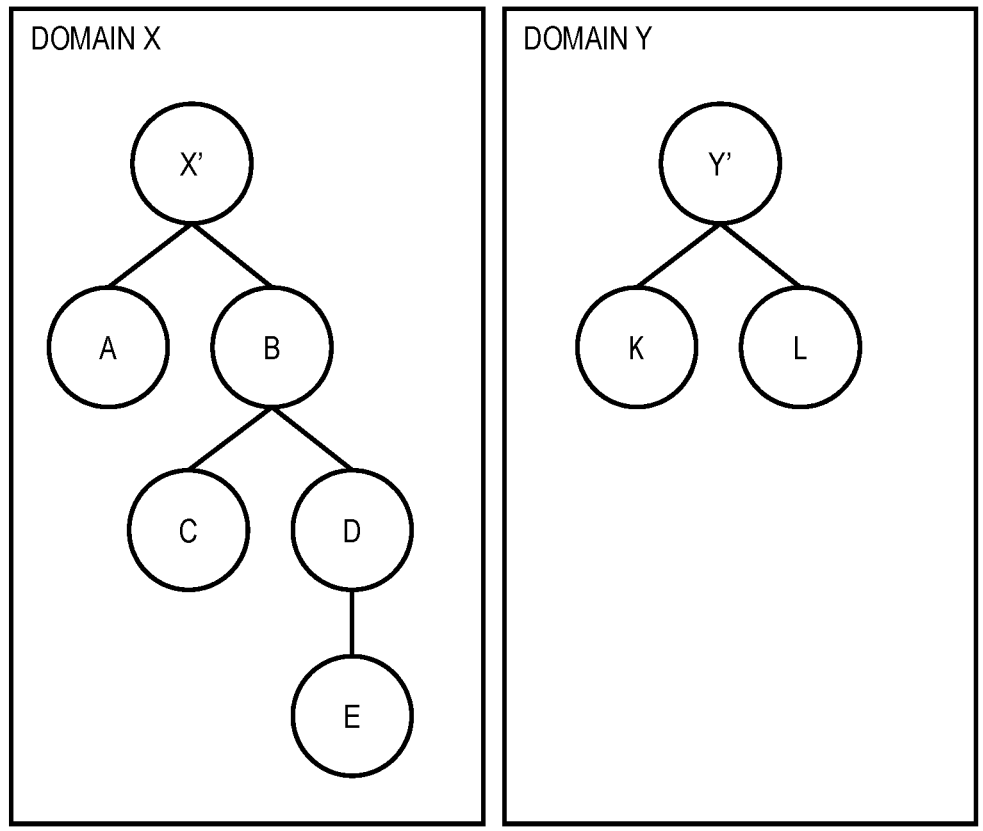
FIG. 3 is a diagram of two example domains X, Y and subdomains that are recursively decomposed therein.

FIG. 3 is a diagram of two example domains X, Y. and subdomains that are recursively decomposed therein. In the present disclosure, subdomains play the role of the sub-network slice, but their behavior and role are fundamentally increased. They are not simply a domain-specific slicing mechanism, but a multi-dimensional decomposition vehicle. All subdomains start with the full scope of a management domain and can be decomposed into one or more of the same. Each child becomes a sovereign entity and is a potential target for further decomposition while ignoring any resources outside of its boundaries. This means that all subdomains are treated equally regardless of their originating domain or their position within the hierarchy.

This also means that every physical or virtual resource can exist in only one subdomain at any point in time. It is the subdomain's contribution to different application slices' lifecycle that will dictate the availability of resources for one or many service instances (described later). Hence, the subdomain itself always provides a single point of control defining the boundary of its resources' availability.

FIG. 3 illustrates such behavior. Initially, all domain X resources were contained in subdomain X'. But with decomposition occurring, the amount of resources contained in X' is decreased in favor of A and B, while further decomposing B, has no direct impact on X'.

The following table provides a set of rules defined to ensure dynamic composition of subdomains being applied properly:

| Attributes | Description |
| --- | --- |
| id | Unique identifier that is system generated |
| name | User-defined name for the subdomain |
| description | User-defined description field |
| parentId | Reference to the parent subdomain. The decomposition of this referred parent resulted in the current subdomain |
| domainId* | Reference to the domain. All resources included in this subdomain as a result of the parent's decomposition, belong to the same domain |
| ownerTenantId* | Reference to the owner tenant. The owner of a subdomain is the tenant that executed its creation |
| decomposable | Boolean identifying if further decomposition is permitted |
| assignable | Boolean indicating whether the user can assign a subdomain |
| scope | The scope of a subdomain defines its eligibility to be assigned to application slices. Three levels of share-ability can be supported as illustrated by the following table: |

Note:
*identifies internal management fields that are not exposed by any API

| Scope | Description |
| --- | --- |
| Common | Subdomain can be assigned to any number of Application Slices without any restrictions |
| Tenant | Subdomain can be assigned to any number of application slices as long as all those Slices are held by tenants within the same hierarchical lineup (application slice assignment will be explained later in this section) |
| Application | Subdomain can be only assigned to a single application slice at any point of time |

Looking at the fields defined for subdomains it becomes clear that subdomain decomposition is intended to achieve a restriction of capabilities recursively. Such restriction is obtained via the isolation of each subdomain within the containment hierarchy and enforced by the fact that resources are assignable to a unique subdomain.

Later in the hierarchical slice composition section, the validation rules related to subdomains will crystalize further the isolation of subdomains. But it also shapes the creation/update rules that need to be enforced:

To further crystalize the isolation of subdomains, the following business rules have been defined that control the creation and the update:

| Attributes | Creation rules | Update rules |
| --- | --- | --- |
| name | Not empty | Not empty |
| parentId | 1. not empty<br>2. user has access to parent subDomain<br>3. parent subDomain is decomposable | Not allowed to change |
| domainId | Same as parent's domainId | Not allowed to change |
| Owner-TenantId | Same as Tenant executing the operation | Not allowed to change |
| Decomposable | Can be set to true only if the parent is decomposable | Changing from True → False should only be allowed if the subDomain does not have any children |
| assignable | Can be set to true only if the parent is assignable | Changing from True → False should only be allowed if subDomain is still assigned to the tenant's default Slice<br>Changing from False → True should only be allowed if parent subDomain has assignable = true |
| scope | 1. not empty<br>2. same as the scope of parent subDomain or more restrictive as illustrated by the following Scope Creation Rules table: | 1. Not empty<br>2. Not less restrictive than the scope of the parent subdomain<br>If rule 2 allows the change, then the following should apply as illustrated by the following Scope Update Rules table: |

Scope Creation Rules Table

| Parent Scope | Child Scope Options |
| --- | --- |
| Common | Application, Tenant, Common |
| Tenant | Application, Tenant |
| Application | Application |

Scope Update Rules Table

| From | To | Rule |
| --- | --- | --- |
| Application | Tenant | Yes |
| Application | Common | Yes |
| Tenant | Application | only if subDomain assigned to one single slice |
| Tenant | Common | Yes |
| Common | Application | only if subDomain assigned to one single slice |
| Common | Tenant | only if subDomain assigned to slices belonging to the same tenant or sub-tenants along the hierarchy |

Hierarchical Slice Composition

Figure 4:
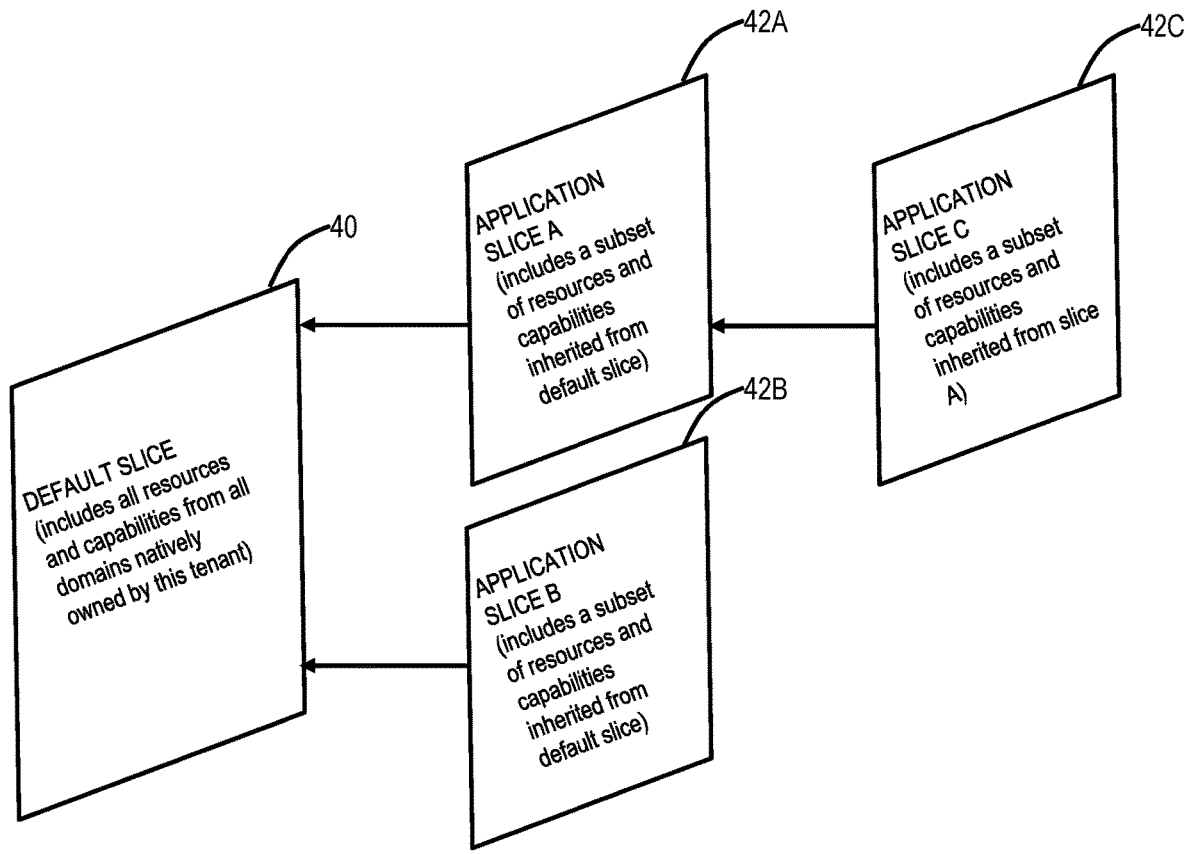
FIG. 4 is a diagram of a default slice that is vertically sliced through application slices.

FIG. 4 is a diagram of a default slice 40 that is vertically sliced through application slices 42A, 42B, 42C. Once the different domains are recursively decomposed into subdomains, as in FIG. 3, it is at this stage that vertical slice composition comes in play to provide the cross-domain/cross-layer end-to-end set of capabilities. The application slices 42A, 42B, 42C are simply the vehicle assuring that all needed resources and policies are available to guarantee the intended service feasibility, characteristics, and performance.

Being the container that defines the service's lifecycle, the application slices 42A, 42B, 42C are the entity used for delegation of resources from a parent tenant to a child. Each tenant starts with a default application slice 40 that represents the total capabilities that it is natively entitled to. It represents the aggregation of all potential services across all domains and technologies. Only after child slices 42A, 42B, 42C are composed that part of this potential is possibly delegated to a child tenant. Hence, an application slice 42A, 42B, 42C can be held by one single tenant at any point in time.

The parent-child relationship of application slices 42A, 42B, 42C is of inheritance nature. It defines an envelope of assets and potential that a parent will grant to children. Starting from the unmitigated default slice 40, capabilities for potential services get defined as illustrated in FIG. 4. Those capabilities are described in the form of the decomposed subdomains that get assigned to the slices 40, 42A, 42B, 42C. A collection of resources are grouped together into a subdomain to represent a certain capability that gets available to the slice 40, 42A, 42B, 42C.

The resulting hierarchy of subdomains and the hierarchy of slices sets the ground rules of subdomain to Slice assignment: a Child subdomain can be in the same Slice as its parent or one of its child slices, but never in a parent slice resulting hierarchy of subdomains and the hierarchy of slices setting the ground rules of subdomain to Slice assignment: a Child subdomain can be in the same Slice as its parent or one of its child slices, but never in a parent slice.

To fulfill this paradigm, the application slices 42A, 42B, 42C are defined as follows;

| Field | Description |
| --- | --- |
| id | Unique identifier that is system generated |
| name | User-defined name for the ApplicationSlice |
| description | User-defined description field |
| parentId | Reference to parent Slice from which the capabilities was inherited |
| extendable | Boolean to define if this Slice policy allows the extension with subdomains from outside the Slice hierarchy tree |

-continued

| Field | Description |
|---|---|
| ownerTenantId | Reference to the Tenant who created this Slice instance |
| holderTenantId | Reference to the Tenant who currently has control over the capabilities and services of the Slice |
| gao | Group Access Object refers to the list of Tenants across the Tenant hierarchy branch leading to the current holderTenant |
| isDefault | Boolean - Only true for the Tenant unique default Slice |
| subDomainList | List of subdomains this slice received from its parent |
| extendedSubDomains | List of subdomains augmented to the Slice from adjacent slices. |

The Group Access Object (GAO) provides the intersection between the application slices 42A, 42B, 42C inheritance hierarchy, and the tenant's hierarchy. The position of a tenant within the GAO defines its level of authority over the slice's lifecycle at a specific point of time. The owner and the holder are identifiers of two key positions within this GAO. The GAO can capture the Tenants allowed to operate on the Slice. With respect to the Slice assignment to Tenant assignment, the rules include that a Child Tenant cannot hold a Slice higher in the Slice hierarchy than the one held by the parent tenant.

Figure 5:
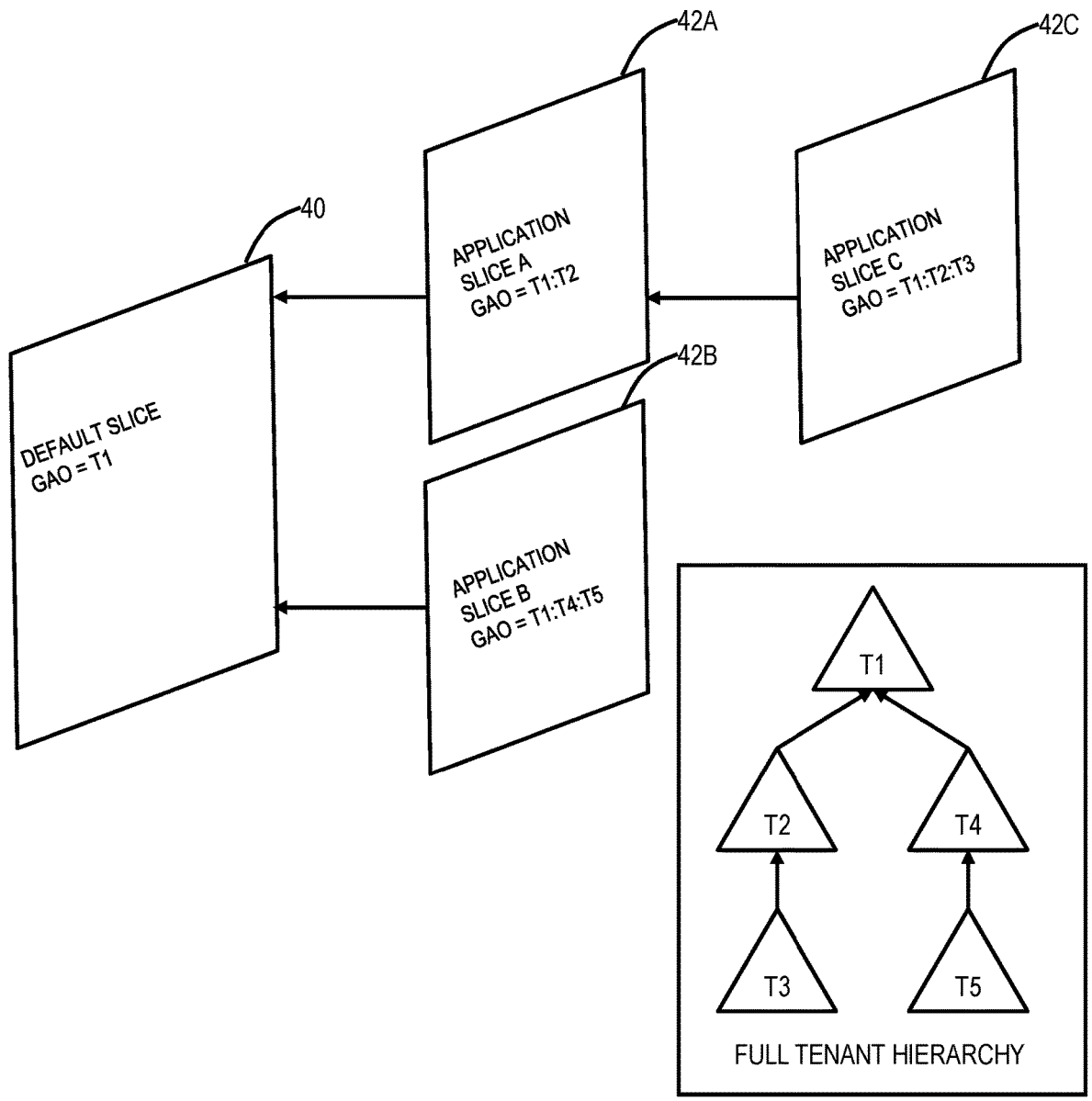
FIG. 5 is a diagram of an example of the Group Access Object (GAO) with respect to FIG. 4.

FIG. 5 is a diagram of an example of the Group Access Object (GAO) with respect to FIG. 4. The head of the GAO structure does not have to be the owner, while the holder always sits at the tail of the structure. The interpretation and the implications of those positions are further detailed in the "application slice management" section.

The other imperative construct of the application slices 42 is the rules governing their creation and update:

| Field | Creation rules | Update rules |
|---|---|---|
| name | Not empty | Not empty |
| parentId | 1. not empty<br>2. user has access to parent appSlice | Must not change |
| extendable | can only be set to true if the parent has extendable = true | Changing from True → False should only be allowed if the two conditions are met:<br>The App Slice does not have any entries in the field extendedSubDomains<br>The App Slice does not have any children with extendable = true<br>Changing from False → True should only be allowed if parent App Slice has extendable = true |
| ownerTenantId | System automatically sets it to the Tenant executing the operation | Must not change |
| holderTenantId | Initially set to the same value as the ownerTenantId | The API to edit an App Slice should not be used to set the holderTenantId. If the holderTenantId is changed, the operation should fail. The assign operation should be used instead. |
| subDomainList | must be a subset of the subDomainList of the parent App Slice<br>cannot contain any subDomains that are not present in the parent App Slice | 1. must be a subset of the subDomainList of the parent App Slice<br>2. cannot contain any subDomains that are not present in the parent App Slice<br>3. The API to edit an App Slice should not be used to set the subDomainList. if the list is changed, the operation should fail. The assignSubDomain operation should be used instead |
| extendedSubDomains | During creation this field must be empty | The API to edit an App Slice should not be used to set the extendedSubDomains. if the list is changed, the operation should fail. The extend operation should be used instead. |

Application Slice Composition

With the two main aspects covered, namely the subdomains and the application slices, it is imperative to define their interaction. The true value of this concept is crystallized by the overlay of these entities Subdomains Workflow within Application Slices The subdomains can be decomposed recursively, and each recursion is a fully isolated subset of the domain's capabilities, they cannot flow freely across application slices 42. They are bound by the relation of their own containment tree. While the system or the user has full control over their assignment to slices and how deep they will reach into its hierarchy, they always need to expand and contract following an accordion pattern. This guarantees that a child slice 42 inherits a subset of the assets within the capabilities of the parent slice and can never have a larger context of capabilities than its parent. Moreover, each operation becomes fully revertible without any risk of compromising the integrity of the system. Hence fully adjustable to the network demands. In other words, as the slices 42 get deleted or reduced, subdomains have a natural compression path into originating slice context. During this expansion/compression process, the GAO is always maintaining the integrity of the third dimension, being the tenant hierarchy.

Figure 6:
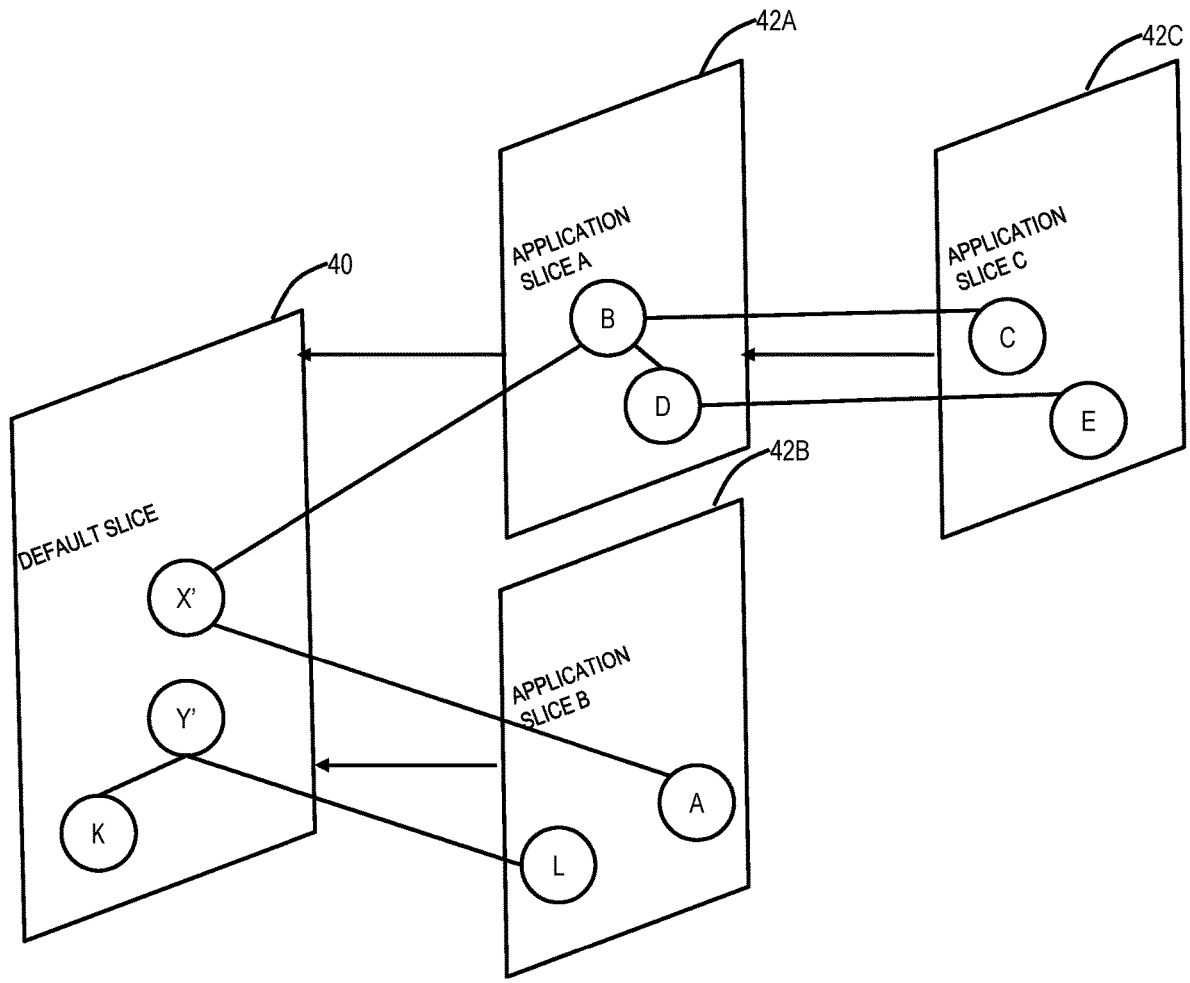
FIG. 6 is a diagram illustrating the default slice that is vertically sliced through the application slices and the subdomains therein.

FIG. 6 is a diagram illustrating the default slice 40 that is vertically sliced through the application slices 42A, 42B, 42C, and the subdomains therein. FIG. 6 shows how in the event that a Slice is retired, how each Subdomain will retract. The actual position of a subdomain in a slice and this slice's current placement within the tenant hierarchy (GAO), has a major impact on the possible outcomes and imposed limitations. The business rules are as follow:

| Subdomain Operation | Owner of Subdomain | Owner of Slice containing the Subdomain | Holder of Slice (Subdomain in SD List) | Any Predecessor Holder of Slice containing the Subdomain |
|---|---|---|---|---|
| Creation (Decomposition) | Yes | Yes | Yes | No |
| Deletion | Yes | No | No | No |
| Update Attributes | Yes | No | No | No |
| Assign Resources | Yes | No | No | No |
| Unassign Resources | Yes | No | No | No |
| Retrieval | Yes | Yes | Yes | Yes |

Extended Subdomains Workflow within Application Slices

Beside assigning subdomains to slices, there is also the possibility to extend application slices with additional subdomains. The main difference between the two approaches is that using application slice inheritance, where subdomains get assigned to the slice, helps further scope and restrict the capabilities of the slice. At the same time, when the application slice is passed to a child tenant to use, that tenant might need to extend that slice with its own onboarded resources to achieve certain functionality. That way, multi-tenancy is enabled with complete segregation. The child tenant has now the possibility to enrich the slice while maintaining its integrity.

While each domain can be partitioned into subdomains and assigned within its own hierarchy of slices, at some point of time, the path of two non-hierarchical slices needs to cross. Therefore, besides the fact that each subdomain is present somewhere in its main slice/tenant hierarchy, being laterally extended into another slice/tenant tree, imposes additional business rules as follow:

| SubDomain Operation | Holder of Slice (SubDomain is extended SB List) | Any Predecessor Holder of Slice (SubDomain is extended SB List) |
|---|---|---|
| Creation (Decomposition) | Yes | No |
| Deletion | No | No |
| Update Attributes | No | No |
| Assign Resources | No | No |
| Unassign Resources | No | No |
| Retrieval | Yes | Yes[1] |

Note[1]:

Except any tenant that is the parent of the domain owner of the subdomain, that means any tenant present at a higher level in the hierarchy above the owner Tenant of the domain of the Subdomain.

Application Slice Management

The tenant context of an application slice has a major implication on the eligibility of users to execute different operations. Here is a summary of the accessibility to all the management related operations based on the position of the Tenant:

| App Slice Operation | OwnerTenant | HolderTenant | Any Parent of the HolderTenant |
|---|---|---|---|
| Inheritance (Creation) | Yes | Yes | No |
| Deletion | Yes | No | No |
| Update Attributes | Yes | No | No |
| Assign Slice to Tenant | Yes | Yes | Yes |
| Unassign a Slice from a Tenant | Yes | No | Yes |
| Assign SubDomains to Slice | Yes | No | No |
| Extend Slice with SubDomains | Yes | Yes | Yes |
| Unassign SubDomains from Slice | Yes | No | No |
| Retrieval | Yes | Yes | Yes |

At this point, all the pieces to provide a comprehensive slicing experience are presented. But the business rules that govern each operation are greatly dependent on the context in which such operation is being invoked. Those rules need to be continuously enforced and failing to do so can lead to an inconsistent state which compromises the integrity of the overall system. Such compromising state can have serious repercussion on the access control mechanism and the slice's integrity. It can also potentially deadlock its lifecycle.

Application Slice Assignment

Assigning an application slice means changing the value of the holderTenantId and computing a new GAO value. The GAO has the following structure:

<tenantId>::<tenantId>::<tenantId>

It is two colon (::) separated list of tenant universal unique IDs (UUIDs) in order of the assignment. When the application slice 42 is initially created, the holder tenant is the owner who created it. So, in that case, the holderTenantId is the same as the ownerTenantId, and the GAO has one UUID. After the application slice 42 gets assigned to a sub-tenant, the holderTenantId changes and the GAO fields get augmented with the new holder of the slice. Now the field will contain two UUIDs: the owner and the current holder, as illustrated in FIG. 5.

The order of the tenant UUIDs needs to be guarded. The first UUID can be the owner of the slice, e.g., TI in FIG. 5, while the very last one is the current actual holder of the slice. It is important to maintain the order because when a slice gets unassigned from a tenant, looking that this list is the only way to determine to which tenant the application slice needs to go to now. If an application slice has children, by default assign all the child application slices to the same tenant.

Application Slice Deletion

Only the owner of an application slice is allowed to delete it. The application slice must be held by the owner of the slice in order to allow the deletion. If it is assigned to a different tenant, the operation should fail. If the application slice has children, all child App Slices need to be deleted recursively. The lowermost application slice needs to be deleted first.

During the slice deletion, the following rules apply for the subdomains inside the slice For the domains of the subdomains owned by the tenant owning the slice—1) assign the subdomains to the parent slice if the tenant owns the subdomain and holds the parent slice, 2) assign the subdomains to the default slice of the tenant if the tenants own the subdomain but does not hold the parent slice, or 3) delete the subdomain if the tenant does not own the subdomain.

For the domains of the subdomains owned by any of the parent tenants but the tenant owning the slice does not own the subdomain, assign them to the parent application slice.

For the domains of the subdomains owned by any of the parent tenants but the tenant owning the slice owns the subdomain—1) delete the subdomain if the parent application slice is not held by the tenant owning the slice, or 2) assign the subdomain to the parent application slice if the tenant owning the slice is holding the parent application slice.

These deletion rules can be summarized as follows

| Owns SD | Owns Domain | Holds Parent Slice | Outcome |
|---|---|---|---|
| yes | no | no | Delete SD |
| yes | no | yes | Assign SD to parent Slice |
| no | no | yes or no | Assign SD to parent Slice |
| yes | yes | no | Assign SD to default Slice of Tenant |
| yes | yes | yes | Assign SD to parent Slice |
| no | yes | yes or no | Delete SD |

Application Slice Un-Assignment

When un-assigning a slice from a tenant, it is recursively un-assigned from all the sub-tenants. If an application slice being un-assigned has children, the following needs to happen in order—1) traverse the tree of child slices, if there is one that is owned by the tenant or any of its children, the slice is being un-assigned from, =>delete the slice, and 2) for every other slice, perform the un-assign operation top-down, starting from the parent slice. When un-assigning a slice from a tenant, all its children that are owned by the same tenant or any of its children are deleted. The rules of application slice deletion related to extended subdomains apply for the un-assign operation as well.

Extending an Application Slice

The owner of the application slice should not extend the slice. A tenant assigned an application slice is allowed to extend it with only its own subdomains. The extended list of subdomains is not visible to all tenants having access to the application slice.

Example Use Case

Figure 7:
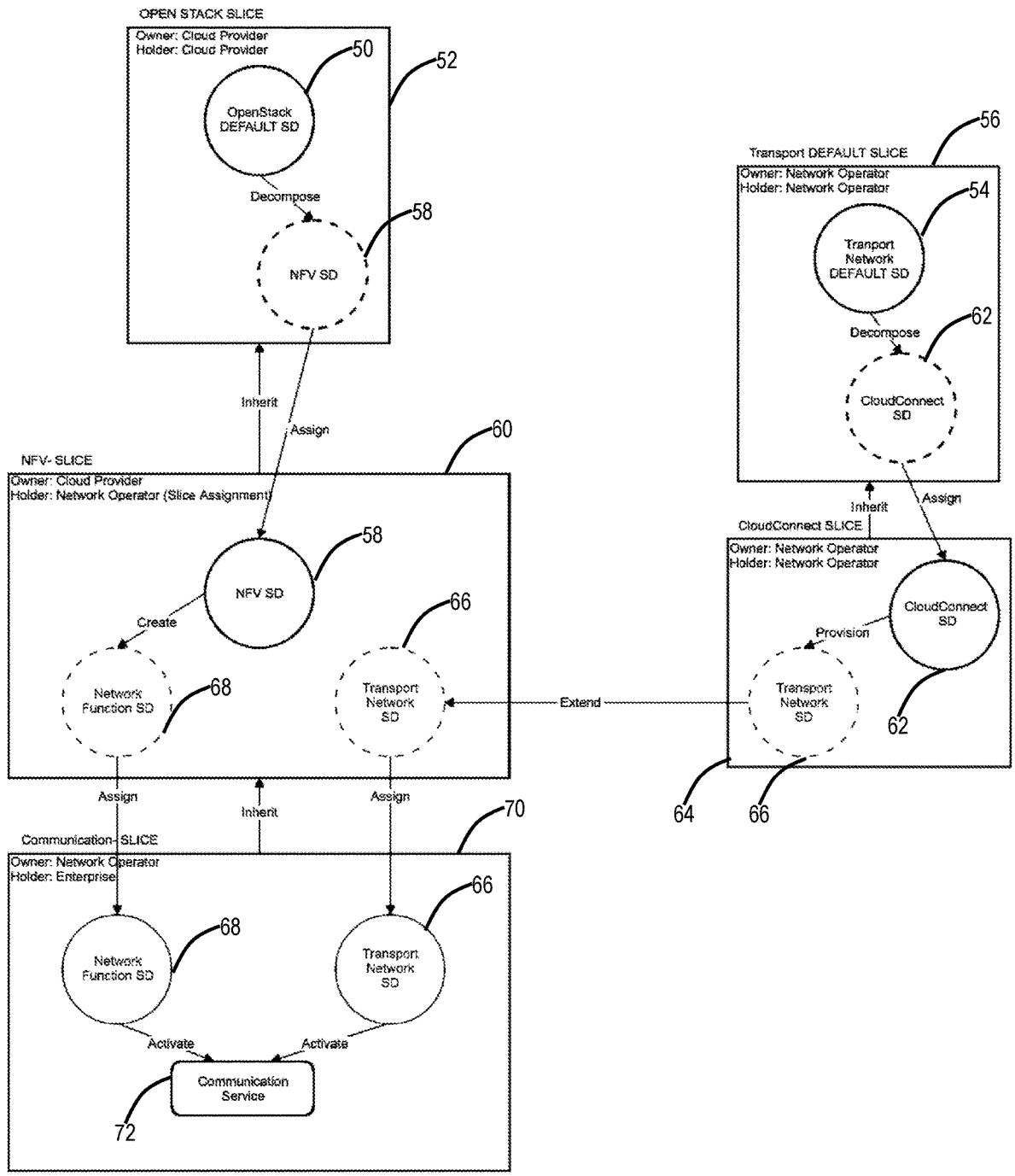
FIG. 7 is a diagram of an example use case of subdomains and application slices.

FIG. 7 is a diagram of an example use case of subdomains and application slices. Here, a cloud provider has a default subdomain 50 with all of the OpenStack resources. This subdomain 50 is part of the cloud provider's default application slice 52. OpenStack, e.g., a software platform for cloud computing, mostly deployed as infrastructure-as-a-service, whereby virtual servers and other resources are made available to customers. A network operator has a default subdomain 54 with all the networking resources. This subdomain is part of the network operator's default application slice 56. Thus, the example of FIG. 7 has two example default slices 52, 56, for the cloud provider and the network operator.

The cloud provider decomposes the default subdomain 50 and creates a new Network Functions Virtualization (NFV) subdomain 58, then creates a new NFV slice 60 that inherits from the default application slice 52, then assigns the NFV subdomain 58 to the NFV slice 60. The cloud provider then assigns the NFV slice 60 to the network operator.

The network operator can carve out a small portion of its network into a new CloudConnect subdomain 62, then the network operator creates a new CloudConnect slice 64 inheriting from the transport default slice 56, and then assigns the CloudConnect subdomain 62 to it. The network operator can provision a transport network service in the CloudConnect slice 64. A new subdomain 66 is auto-created and includes the resulting transport network service.

The network operator can extend the NFV slice 60 received from the cloud provider, with the provisioned transport network service subdomain 66. The network operator can use the NVF subdomain 60 to create a Network Function (NF-Service). A new subdomain 68 is auto-created and includes the resulting Network Function service.

The network operator can create a new communication slice 70 that inherits from the NFV slice 60. The network function and the transport network subdomains 66, 68 are assigned to this slice 70. The network operator can assign the communication slice 70 to an enterprise client. The enterprise client can activate the network functions, which uses the transport network for connectivity, and results in an end-to-end communication service 72.

Subsetwork Slice Instances Creation and Management

Of note, the present disclosure includes the concept of subdomain containment that means subnetwork slices can only be created from a parent slice and contact a subset of the parent's resources. In contrast to the Network Slicing Standards, the present disclosure introduced different shareability rules for subnetwork slices, such as application: not shareable, common: shareable without restrictions, and tenant: shareable, but among only one line of tenant hierarchy.

Network Slice Instances Creation and Management

For application slice constraints—network slice inheritance. A network slice always inherits from a parent slice and is therefore allowed only to be defined with more rigid and restrictive policies and constraints than the parent slice.

For application slice composition, network slices can only be composed from a subset of the parent's subnetwork slices. Furthermore, during the creation the subnetwork slice containment tree is respected: children of subnetwork slices can only live in the same network slice as their parent or be moved downward in a child network slice.

For application slice for NaaS, the present disclosure introduces the concept of adding GAO (Group Access Object) information to each network slice. The GAO allows the network slice to be aware of where it sits at any point within the tenant hierarchy. It controls the tenants entitled to management and service activation. This GAO information contained in the slice also defines the scope of the slice's own accessibility as well as the access to subnetwork slices and their resources.

For application slice extension, part of making the present disclosure more dynamic and flexible is the notion of network slice extension, which allows holder tenants to extend network slices assigned to them with their own subnetwork slices. During the portion of the lifecycle when the slice is assigned by the owner tenant to one of its child tenants, the holder tenant is allowed to augment the overall context of the slice with its own on-boarded resources in order to be able to fulfill the slice's end-to-end role. This is especially the case when the child tenant on-boards its own domain and resources and chooses to add a subset of those resources to the slice, in order to use them during the orchestration process. The owner tenant should not have access to the resources of the child Tenant. On withdrawal of the slice from that tenant, the subnetwork slices used for extension need to have a fallback path. However, that should not trigger a decommissioning of the end-to-end service orchestrated using that slice. Extending and compacting the slice based on its assignment creates an accordion effect to it, something that network slicing standards do not cover.

Process

Figure 8:
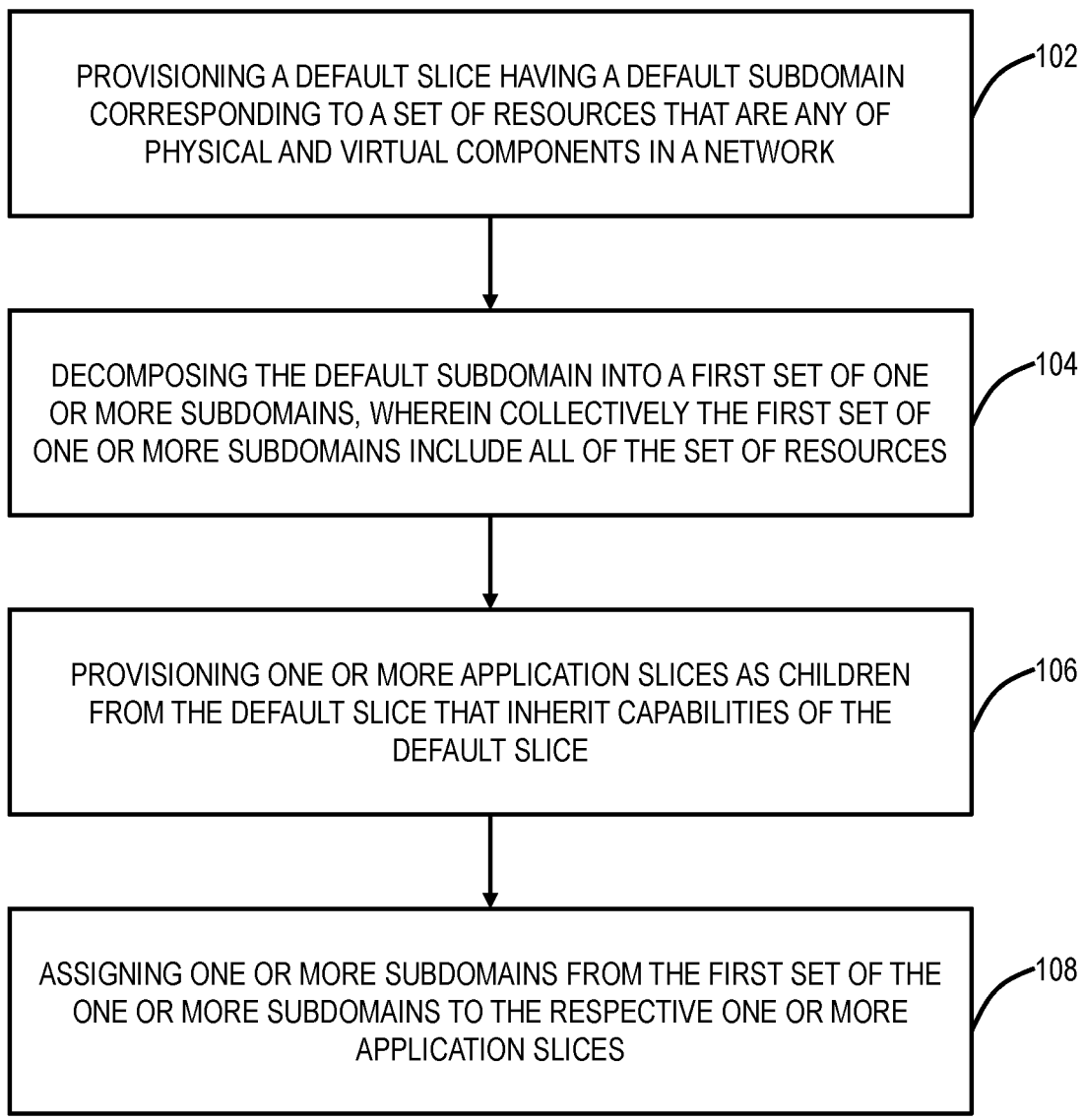
FIG. 8 is a flowchart of a slice decomposition and inheritance process.

FIG. 8 is a flowchart of a slice decomposition and inheritance process 100. The process 100 can be realized via a non-transitory computer-readable medium with instructions that, when executed, cause one or more processors to perform the steps. Further, the process 100 can be realized as a computer-implemented method. Also, the process 100 can be implemented via a processing apparatus such as in FIG. 9.

The process 100 includes provisioning a default slice having a default subdomain corresponding to a set of resources that are any of physical and virtual components in a network (step 102); decomposing the default subdomain into a first set of one or more subdomains, wherein collectively the first set of one or more subdomains include all of the set of resources (step 104); provisioning one or more application slices as children from the default slice that inherit capabilities of the default slice (step 106); and assigning one or more subdomains from the first set of the one or more subdomains to the respective one or more application slices (step 108).

The process 100 can further include performing management of the underlying physical and virtual components utilizing the first set of the one or more subdomains. The process 100 can further include decomposing the first set of the one or more subdomains into a second set of the one or more subdomains, wherein collectively the first set and the second set of the one or more subdomains include all of the set of resources. The process 100 can further include compressing the second set of the one or more subdomains back into the first set of the one or more subdomains.

The process 100 can further include maintaining a Group Access Object for each of the default slices and the one or more application slices to define the authority of tenants for each of the default slice and the one or more application slices. The process 100 can further include deleting an application slice of the one or more application slices by an owner and addressing any subdomains contained therein. The addressing can be as described herein with respect to application slice deletion. The one or more application slices can be each required to have a parent slice which defines associated limits. The one or more application slices can be each required to have a parent slice from which constraints and restrictions are inherited initially and adjusted accordingly. Resources in the first set of one or more subdomains are non-overlapping Processing Device FIG. 9 is a block diagram of a processing apparatus 200 which may be used to realize the orchestrator 14, and/or other systems. The apparatus 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 9 depicts the apparatus 200 in an oversimplified manner, and practical embodiments may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the apparatus 200, a semiconductor-based microprocessor (in the form of a microchip or chipset), or generally any device for executing software instructions. When the apparatus 200 is in operation, the processor 202 is configured to execute software stored within the memory 210, to communicate data to and from the memory 210, and to generally control operations of the apparatus 200 pursuant to the software instructions. The I/O interfaces 204 may be used to receive user input from and/or for providing system output to one or more devices or components. The user input may be provided via, for example, a keyboard, touchpad, and/or a mouse. The system output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the apparatus 200 to communicate over a network, such as the Internet, a wide area network (WAN), a local area network (LAN), and the like, etc. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11 a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the apparatus 200 such as, for example, an internal hard drive connected to the local interface 212 in the apparatus 200. Additionally, in another embodiment, the data store 208 may be located external to the apparatus 200 such as, for example, an external hard drive connected to the I/O interfaces 204 (e.g., SCSI or USB connection). In a further embodiment, the data store 208 may be connected to the apparatus 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to." "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium comprising instructions that, when executed, cause one or more processors to perform the steps of:
provisioning a default slice having a default subdomain corresponding to a set of resources that are any of physical and virtual components in a network;
decomposing the default subdomain into a first set of one or more subdomains, wherein collectively the first set of one or more subdomains include all of the set of resources;
provisioning one or more application slices as children from the default slice that inherit capabilities of the default slice; and
assigning one or more subdomains from the first set of the one or more subdomains to the respective one or more application slices,
wherein the one or more application slices are provisioned by referencing the default slice as a parent and scoping a creation thereof to limits of the parent, wherein the scoping includes a scope that defines accessibility and access to the one or more application slices along with eligibility to be assigned to the one or more application slices, and wherein the scope is limited to no more than a scope of the parent.

2. The non-transitory computer-readable medium of claim 1, wherein the instructions that, when executed, further cause one or more processors to perform the steps of
performing management of the underlying physical and virtual components utilizing the first set of the one or more subdomains.

3. The non-transitory computer-readable medium of claim 1, wherein the instructions that, when executed, further cause one or more processors to perform the steps of
decomposing the first set of the one or more subdomains into a second set of the one or more subdomains, wherein collectively the first set and the second set of the one or more subdomains include all of the set of resources.

4. The non-transitory computer-readable medium of claim 3, wherein the instructions that, when executed, further cause one or more processors to perform the steps of
compressing the second set of the one or more subdomains back into the first set of the one or more subdomains, as a result of a deletion.

5. The non-transitory computer-readable medium of claim 1, wherein the instructions that, when executed, further cause one or more processors to perform the steps of
maintaining a Group Access Object for each of the default slice and the one or more application slices to define authority of tenants for each of the default slice and the one or more application slices.

6. The non-transitory computer-readable medium of claim 1, wherein the instructions that, when executed, further cause one or more processors to perform the steps of
deleting an application slice of the one or more application slices by an owner and addressing any subdomains contained therein.

7. The non-transitory computer-readable medium of claim 1, wherein the one or more application slices each initially inherit constraints and restrictions from the parent and the inherited constraints and restrictions are adjusted accordingly.

8. The non-transitory computer-readable medium of claim 1, wherein resources in the first set of one or more subdomains are non-overlapping.

9. An apparatus comprising:
one or more processors and memory comprising instructions that, when executed, cause the one or more processors to
provision a default slice having a default subdomain corresponding to a set of resources that are any of physical and virtual components in a network,
decompose the default subdomain into a first set of one or more subdomains, wherein collectively the first set of one or more subdomains include all of the set of resources,
provision one or more application slices as children from the default slice that inherit capabilities of the default slice, and
assign one or more subdomains from the first set of the one or more subdomains to the respective one or more application slices,
wherein the one or more application slices are provisioned by referencing the default slice as a parent and scoping a creation thereof to limits of the parent, wherein the scoping includes a scope that defines accessibility and access to the one or more application slices along with eligibility to be assigned to the one or more application slices, and wherein the scope is limited no more than a scope of the parent.

10. The apparatus of claim 9, wherein the instructions that, when executed, further cause the one or more processors to
perform management of the underlying physical and virtual components utilizing the first set of the one or more subdomains.

11. The apparatus of claim 9, wherein the instructions that, when executed, further cause the one or more processors to
decompose the first set of the one or more subdomains into a second set of the one or more subdomains, wherein collectively the first set and the second set of the one or more subdomains include all of the set of resources.

12. The apparatus of claim 11, wherein the instructions that, when executed, further cause the one or more processors to
compress the second set of the one or more subdomains back into the first set of the one or more subdomains, as a result of a deletion.

13. The apparatus of claim 9, wherein the instructions that, when executed, further cause the one or more processors to
maintain a Group Access Object for each of the default slice and the one or more application slices to define authority of tenants for each of the default slice and the one or more application slices.

14. The apparatus of claim 9, wherein the instructions that, when executed, further cause the one or more processors to delete an application slice of the one or more application slices by an owner and addressing any subdomains contained therein.

15. The apparatus of claim 9, wherein the one or more application slices each initially inherit constraints and restrictions from the parent and the inherited constraints and restrictions are adjusted accordingly.

16. The apparatus of claim 9, wherein resources in the first set of one or more subdomains are non-overlapping.

17. A method comprising:

provisioning a default slice having a default subdomain corresponding to a set of resources that are any of physical and virtual components in a network;

decomposing the default subdomain into a first set of one or more subdomains, wherein collectively the first set of one or more subdomains include all of the set of resources;

provisioning one or more application slices as children from the default slice that inherit capabilities of the default slice; and assigning one or more subdomains from the first set of the one or more subdomains to the respective one or more application slices, wherein the one or more application slices are provisioned by referencing the default slice as a parent and scoping a creation thereof to limits of the parent, wherein the scoping includes a scope that defines accessibility and access to the one or more application slices along with eligibility to be assigned to the one or more application slices, and wherein the scope is limited to no more than a scope of the parent.

18. The method of claim 1, further comprising performing management of the underlying physical and virtual components utilizing the first set of the one or more subdomains.

* * * * *